US012631913B2

(12) United States Patent
Oh et al.

(10) Patent No.: US 12,631,913 B2
(45) Date of Patent: May 19, 2026

(54) LIQUID CRYSTAL DISPLAY DEVICE WITH PARTIAL VIEWING ANGLE ADJUSTMENT

(71) Applicant: LG Display Co., Ltd., Seoul (KR)

(72) Inventors: SeongWoo Oh, Gyeongsan-si (KR); DaeYoung Gwon, Ulsan (KR)

(73) Assignee: LG DISPLAY CO., LTD., Seoul (KR)

( * ) Notice: Subject to any disclaimer, the term of this patent is extended or adjusted under 35 U.S.C. 154(b) by 273 days.

(21) Appl. No.: 18/383,752

(22) Filed: Oct. 25, 2023

(65) Prior Publication Data

US 2024/0192533 A1    Jun. 13, 2024

(30) Foreign Application Priority Data

Dec. 12, 2022    (KR) ........................ 10-2022-0173133

(51) Int. Cl.
| | |
|---|---|
| *G02F 1/13* | (2006.01) |
| *B60K 35/65* | (2024.01) |
| *G02F 1/1335* | (2006.01) |
| *G02F 1/13363* | (2006.01) |
| *G02F 1/1343* | (2006.01) |
| *G02F 1/139* | (2006.01) |

(52) U.S. Cl.
CPC .......... G02F 1/1323 (2013.01); B60K 35/654 (2024.01); B60K 35/656 (2024.01); G02F 1/133528 (2013.01); G02F 1/133638 (2021.01); G02F 1/134363 (2013.01); G02F 1/139 (2013.01); B60K 2360/18 (2024.01); B60K 2360/25 (2024.01); B60K 2360/349 (2024.01)

(58) Field of Classification Search
CPC ..................................................... G02F 1/1323
See application file for complete search history.

(56) References Cited

U.S. PATENT DOCUMENTS

2021/0333580 A1* 10/2021 Matsushima ......... G02F 1/1323
2023/0408881 A1* 12/2023 Murzyn ................ G02F 1/1323

FOREIGN PATENT DOCUMENTS

| KR | 10-2008-0051763 A | 6/2008 |
|---|---|---|
| KR | 10-2010-0116079 A | 10/2010 |
| KR | 10-1170911 B1 | 8/2012 |
| KR | 10-2025-0034270 A | 3/2025 |

* cited by examiner

*Primary Examiner* — Edmond C Lau
(74) *Attorney, Agent, or Firm* — Birch, Stewart, Kolasch & Birch, LLP

(57) ABSTRACT

Discussed is a liquid crystal display device that can include a backlight unit, a switching unit disposed on an upper side of the backlight unit and including a first twisted nematic (TN) switching cell configured to change light transmittance for a first direction between a first mode and a second mode and a second twisted nematic (TN) switching cell disposed on an upper side of the first TN switching cell, and an image display layer disposed on an upper side of the switching unit. According to embodiments of the present disclosure, by providing a liquid crystal display device having a triple cell structure including two TN switching cells and one image cell, a light output for a first direction can be effectively blocked in a second mode in which partial viewing angle blocking is needed.

20 Claims, 19 Drawing Sheets

| | |
|---|---|
| Image Top POL (0°) | ~ 540 |
| Image Cell (C/F) | |
| Image Cell (Array) | ~ 400 |
| Image Bot. POL (90°) | ~ 530 |
| TN Top Rubbing (45°) | |
| TN Bot. Rubbing (-45°) | ~ 300 |
| TN Bottom POL (0°) | ~ 524 |
| HWP (67.5°) | ~ 620 |
| TN Top POL (-45°) | ~ 522 |
| TN Top Rubbing (45°) | |
| TN Bot. Rubbing (-45°) | ~ 200 |
| TN Bot. POL (-45°) | ~ 510 |
| BLU | ~ 100 |

[FIRST MODE(Share mode)]          [SECOND MODE(Privacy mode)]

FIG.11A
[FIRST MODE(Share mode)]
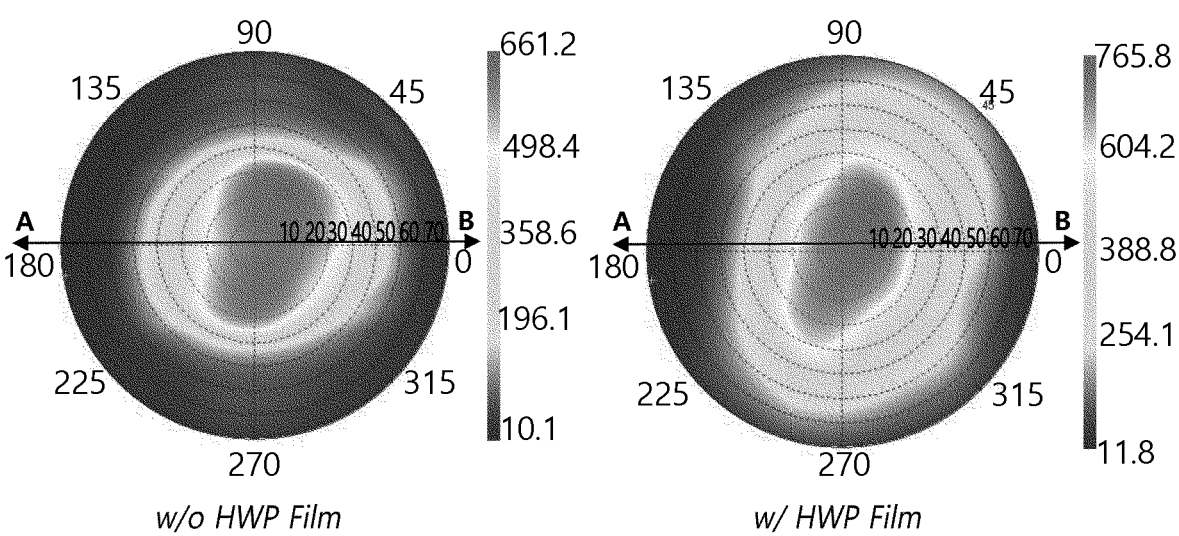
w/o HWP Film        w/ HWP Film
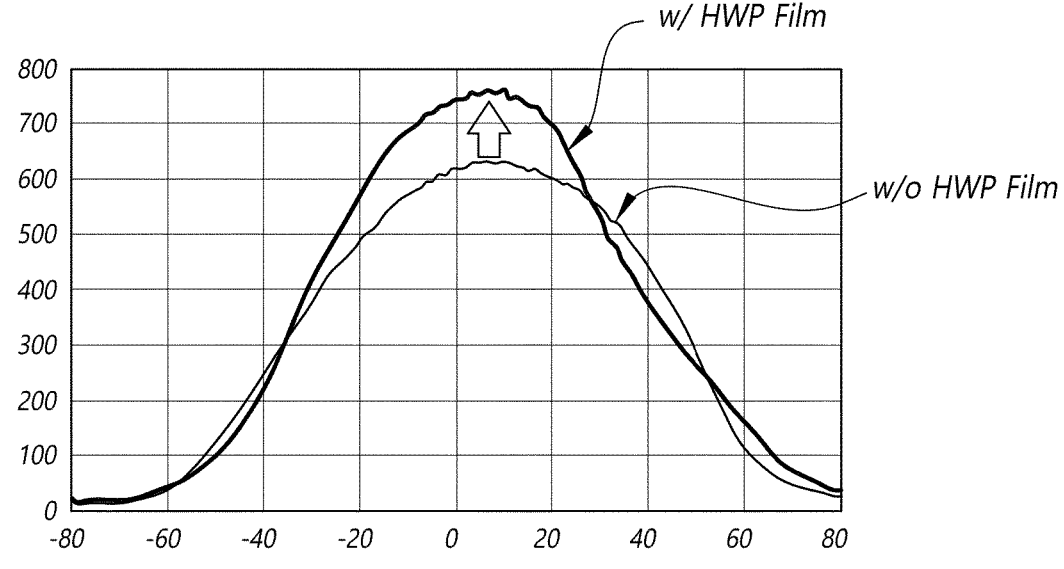

FIG.11B
[SECOND MODE(Privacy mode)]
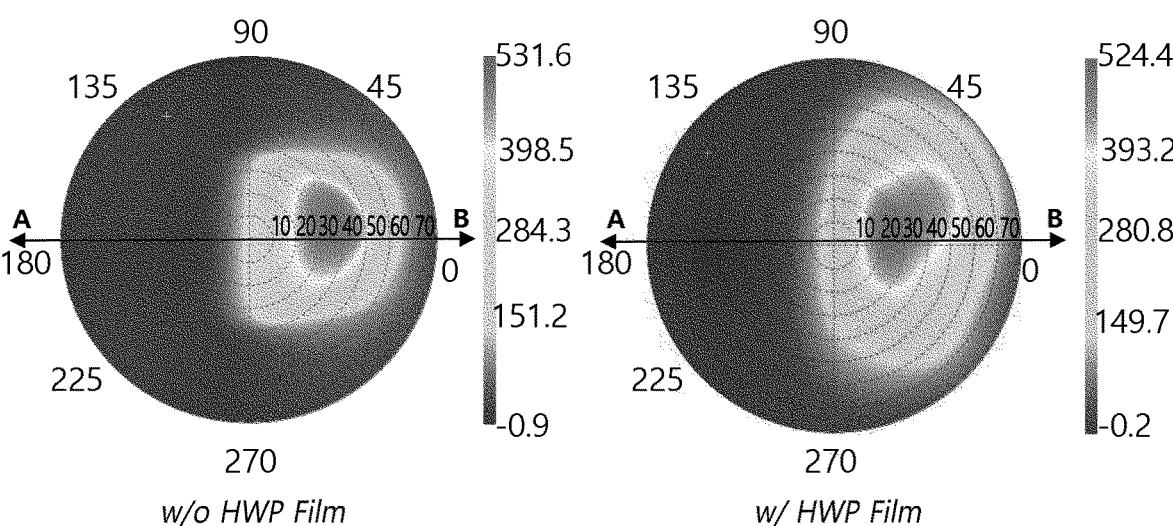
w/o HWP Film         w/ HWP Film
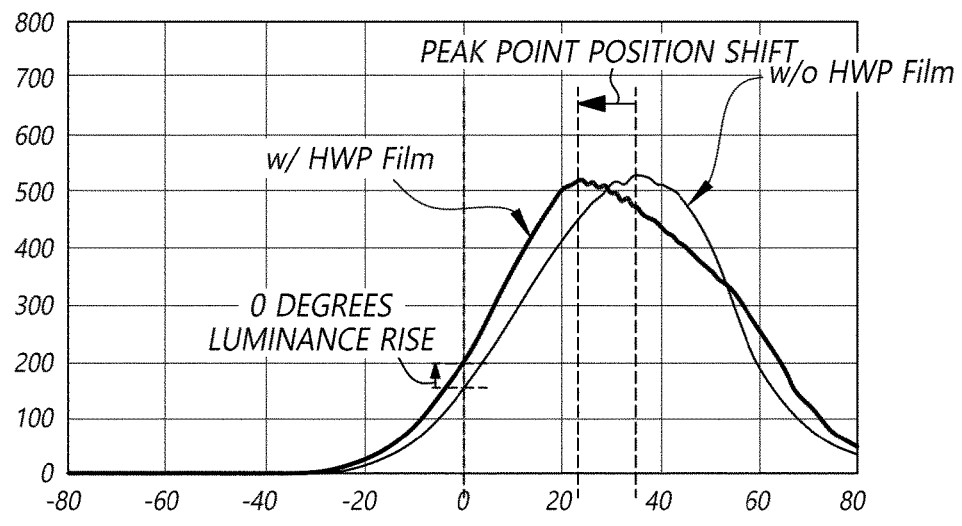

*FIG.12A*

| Image Top POL (0°) |
| Image Cell (C/F) |
| Image Cell (Array) |
| Image Bot. POL (90°) |
| TN Top Rubbing (45°) |
| TN Bot. Rubbing (-45°) |
| TN Bot. POL (0°) |

*FIG.12B*

| Image Top POL (0°) |
|---|
| Image Cell (C/F) |
| Image Cell (Array) |
| Image Bot. POL (90°) |
| HWP (22.5°) |
| TN Top POL (-45°) |
| TN Top Rubbing (45°) |
| TN Bot. Rubbing (-45°) |
| TN Bot. POL (-45°) |

*FIG.12C*

| Image Top POL (0°) |
|---|
| Image Cell (C/F) |
| Image Cell (Array) |
| Image Bot. POL (90°) |
| ECB Top |
| ECB Bot. |
| HWP (22.5°) |
| TN Bot. POL (-45°) |
| TN Top Rubbing (45°) |
| TN Bot. Rubbing (-45°) |
| TN Bot. POL (-45°) |

FIG. 13

LEFT-SIDE 30 DEGREES VIEWING ANGLE CUT-OFF 1% REFERENCE

| Case | STRUCTURE | TN DRIVING VOLTAGE | VIEWING ANGLE | Image PNL RATIO WITH RESPECT TO FRONT-SIDE TRANSMITTANCE | | | | Image PNL RATIO WITH RESPECT TO FRONT-SIDE TRANSMITTANCE | | | |
|---|---|---|---|---|---|---|---|---|---|---|---|
| | | | | Share | Privacy | | | Share | Privacy | | |
| | | | | FRONT SIDE | FRONT SIDE | -30 DEGREES | -45 DEGREES | 100 | 1.0 | 1.5 | 0.6 |
| COMPARATIVE EXAMPLE 1 | IPS / TN | 2.58V | 180 DEGREES | 72.2 | 10.9 | 0.1 | 0.2 | 100 | 15.4 | 17.5 | 6.8 |
| | | | 160 DEGREES | ↑ | ↑ | 1.7 | 1.9 | ↑ | 0.9 | 7.2 | 5.4 |
| COMPARATIVE EXAMPLE 2 | IPS / HWP / TN | 2.47V | 180 DEGREES | 68.4 | 23.9 | 0.2 | 1.7 | 100.0 | 1.6 | 3.4 | 4.9 |
| | | | 160 DEGREES | ↑ | ↑ | 0.4 | 0.8 | ↑ | 1.1 | 6.0 | 4.7 |
| COMPARATIVE EXAMPLE 3 | IPS / ECB / HWP / TN | 2.45V | 180 DEGREES | 65.5 | 24.1 | 0.3 | 1.4 | ↑ | 1.1 | 6.0 | 4.7 |
| | | | 160 DEGREES | ↑ | ↑ | 0.4 | 0.7 | ↑ | 1.8 | 3.1 | 4.8 |
| FIRST EMBODIMENT | IPS / HWP / TN / TN | 2.23V | 180 DEGREES | 53.9 | 16.5 | 0.1 | 0.0 | ↑ | 0.9 | 0.2 | 0.5 |
| | | | 160 DEGREES | ↑ | ↑ | 0.2 | 0.0 | ↑ | 1.5 | 0.0 | 0.2 |
| SECOND EMBODIMENT | IPS / TN / HWP / TN | 2.2V | 180 DEGREES | 49.2 | 12.3 | 0.1 | 0.0 | ↑ | 1.1 | 0.0 | 0.0 |
| | | | 160 DEGREES | ↑ | ↑ | 0.3 | 0.0 | ↑ | 2.4 | 0.0 | 0.7 |
| THIRD EMBODIMENT | IPS / TN / TN | 2.44V | 180 DEGREES | 63.1 | 8.9 | 0.1 | 0.0 | ↑ | 0.9 | 0.6 | 0.9 |
| | | | 160 DEGREES | ↑ | ↑ | 0.1 | 0.1 | ↑ | 0.7 | 1.4 | 6.0 |

LIQUID CRYSTAL DISPLAY DEVICE WITH PARTIAL VIEWING ANGLE ADJUSTMENT

CROSS-REFERENCE TO RELATED APPLICATION

This application claims priority to Korean Patent Application No. 10-2022-0173133, filed in the Republic of Korea on Dec. 12, 2022, the entire contents of which are hereby expressly incorporated by reference into the present application.

BACKGROUND

Field

Embodiments of the present disclosure relate to a liquid crystal display device, and more particularly, to a liquid crystal display device with partial viewing angle adjustments.

Description of Related Art

A liquid crystal display device is a device that displays an image or a video by adjusting transmittance of light emitted from a backlight unit by adjusting an orientation direction of liquid crystals included in a display panel.

Recently, such liquid crystal display devices are not only widely used in communication/broadcasting devices such as a TV set and a mobile communication terminal but also are widely used in vehicles as displays that provide information.

In a vehicle, a cluster for providing vehicle information such as a vehicle speed and the like in front of a driver, a vehicle information guide display (center information display (CID)) for providing vehicle driving guide information such as a map and a navigation, a co-driver display (CDD) that is disposed in front of a co-driver's seat and provides entertainment information and the like not relating to the vehicle driving, and others similar thereto can be provided.

Particularly, in accordance with an increase in sizes of vehicle displays, the cluster, the CID, and the CDD described above can be implemented as a single display panel or display device, and this is also referred to as a Pillar-to-Pillar display.

In this way, in a case in which a large-screen display of the single display panel or display device of a vehicle is used, a video displayed in a CCD needs to be not seen in the visual field of a driver at the least during driving or operation of the vehicle by the driver, and safety of the vehicle driving can be secured through preventing viewing of the video by the driver that is unrelated to the vehicle driving guide information during the driving or operation of the vehicle.

Generally, a mode in which a video is provided for all the passengers with a viewing angle of a vehicle large-screen display maximally secured under a condition of vehicle stop or the like can be referred to as a share mode or a privacy-off mode, and a mode in which a video display characteristic of a driver-direction viewing angle is degraded or reduced for a partial area (for example, a CCD area on a side in front of a co-driver's seat) of a display under a condition of vehicle driving or the like can be referred to as a privacy-on mode.

In a case in which a vehicle display is implemented using one or a single display panel or display device, only a viewing angle of a partial area of the single display panel needs to be partly adjusted. This can be referred to as a partial viewing angle adjustment function or a partial share-privacy mode (partial SPM) function.

Although various measures have been proposed for a partial viewing angle adjustment function of a display device, there are disadvantages such as a manufacturing limit of a large-sized display, an increase in power consumption, insufficiency of viewing angle limiting function performance for a specific direction, and the like.

Thus, there is need for a display device that can improve various existing disadvantages while being able to perform partial viewing angle adjustment.

SUMMARY OF THE DISCLOSURE

Thus, in the present disclosure, a display device having a partial viewing angle adjustment function is to be provided.

In one embodiment of the present disclosure, a display device having a viewing angle adjustment function between first and second modes only for a partial area of a single display panel is to be provided.

In one embodiment of the present disclosure, a display device capable of improving a light blocking characteristic for a specific direction in a narrow viewing angle mode while providing a large light amount with a wide viewing angle in a wide viewing angle mode is to be provided.

In one embodiment of the present disclosure, a display device, which includes two twisted nematic (TN) switching cells and one image cell, having a partial viewing angle adjustment function is to be provided.

More specifically, according to embodiments of the present disclosure, by including two twisted nematic (TN) switching cells, one image cell, and multiple polarization plate and/or half wave plate (HWP) films, a display device capable of improving a light blocking characteristic for a specific direction in a narrow viewing angle mode while providing a large light amount with a wide viewing angle in a wide viewing angle mode is to be provided.

A liquid crystal display device with partial viewing angle adjustment according to one embodiment of the present disclosure can include: a backlight unit; a switching unit that is disposed on an upper side of the backlight unit and includes a first TN switching cell changing a light output for a first direction between a first mode and a second mode in a partial area and a second TN switching cell disposed on an upper side of the first TN switching cell; and a liquid crystal display panel as an image display layer disposed on an upper side of the switching unit.

In addition, a first polarization plate disposed between the backlight unit and the first TN switching cell, a second polarization plate disposed between the first TN switching cell and the second TN switching cell, and a third polarization plate disposed between the second TN switching cell and a liquid crystal display panel can be further included. Furthermore, a fourth polarization plate disposed on an upper side of the liquid crystal display panel can be further included.

In addition, the third polarization plate can include a (3-1)-th polarization plate disposed on an upper side of the second TN switching cell and a (3-2)-th polarization plate disposed on a lower side of the liquid crystal display panel, and the display device according to one embodiment of the present disclosure can further include a first half-wave plate (HWP) film disposed between the (3-1)-th polarization plate and the (3-2)-th polarization plate.

In such a case, each of the first TN switching cell and the second TN switching cell can include upper and lower liquid crystal layers oriented at 45° and −45°, an upper TN cell electrode, and a lower TN cell electrode.

In addition, the first polarization plate and the (3-1)-th polarization plate can have a 45° linear polarization characteristic, the second polarization plate can have a 45° linear polarization characteristic, and the (3-2)-th polarization plate can have a 90° linear polarization characteristic.

In addition, as another embodiment, the second polarization plate can include a (2-1)-th polarization plate disposed on an upper side of the first TN switching cell and a (2-2)-th polarization plate disposed on a lower side of the second TN switching cell, and the display device can further include a second half wave plate (HWP) film disposed between the (2-1)-th polarization plate and the (2-2)-th polarization plate.

In such a case, each of the first TN switching cell and the second TN switching cell can include upper and lower liquid crystal layers oriented at +45°, an upper TN cell electrode, and a lower TN cell electrode.

In addition, the first polarization plate can have a 45° linear polarization characteristic, the (2-1)-th polarization plate can have a −45° linear polarization characteristic, the (2-1)-th polarization plate can have a 0° linear polarization characteristic, and the third polarization plate can have a 90° linear polarization characteristic.

In addition, according to a further another embodiment, the first TN switching cell can include upper and lower liquid crystal layers oriented at 90° and 0°, an upper TN cell electrode, and a lower TN cell electrode, and the second TN switching cell can include upper and lower liquid crystal layers oriented at 0° and 90°, an upper TN cell electrode, and a lower TN cell electrode.

In such a case, the first polarization plate and the third polarization plate can have a 90° linear polarization characteristic, and the second polarization plate can have a 0° linear polarization characteristic.

On the other hand, in the liquid crystal display device according to one embodiment of the present disclosure, the liquid crystal display panel can be a liquid crystal display panel of an in-plane switching (IPS) type in which pixel electrodes and common electrodes are disposed on the same plane of an array substrate.

The liquid crystal display device according to one embodiment of the present disclosure can include a cluster display area on a side in front of a driver's seat, a co-driver's seat display area (CDD) on a side in front of a co-driver's seat, and a center display area (CID) disposed between the cluster display area and the co-driver's seat display area (CDD) as a display device for a vehicle.

In such a case, the first mode can be a wide viewing angle mode in which a large amount of light is output in directions of a driver's seat and a co-driver's seat, the second mode can be a narrow viewing angle mode in which a small amount of light is output in the direction of the driver's seat, and the first direction can be a direction toward the driver's seat. At this time, the wide viewing angle mode can be a share mode operating under a vehicle stopping condition, and the narrow viewing angle mode can be a privacy mode operating under a vehicle driving condition.

In addition, in the liquid crystal display device according to one embodiment of the present disclosure, the backlight unit can provide light that is stronger for the co-driver's seat display area (CDD) than for the cluster display area at the time of being operated in the second mode.

By using a liquid crystal display device according to embodiments of the present disclosure, a partial viewing angle adjustment function changing the amount of light for a specific direction only in a partial area of a large-screen display device can be provided.

Particularly, by minimizing output of light of a co-driver display area in a driver's seat direction in a privacy mode, a large-screen display device for a vehicle capable of performing partial viewing angle adjustment can be provided.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

FIGS. 11A and 11B are diagrams illustrating effects according to use of a half-wave (HWP) film used in an embodiment of the present disclosure.

FIGS. 12A to 12C illustrate cross-sections of liquid crystal display devices according to first to third comparative examples for comparison with embodiments of the present disclosure.

FIG. 13 is experiment data illustrating effects of partial viewing angle adjustment characteristics according to the first to third embodiments of the present disclosure compared with those of the first to third comparative examples disclosed in FIG. 10.

DETAILED DESCRIPTION OF THE EMBODIMENTS

Figure 1:
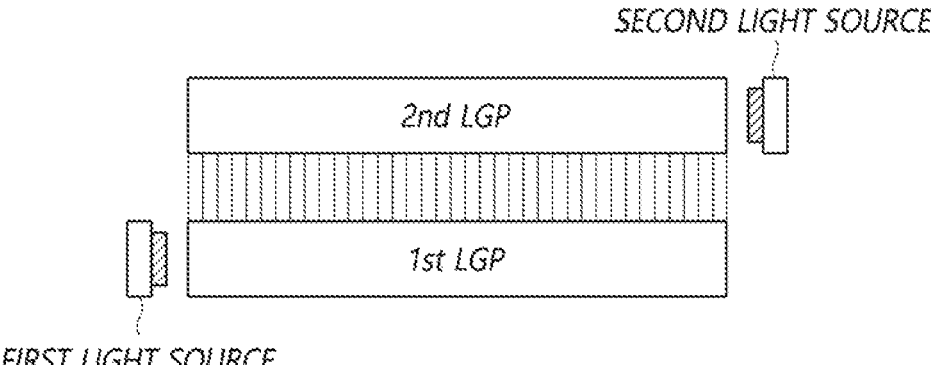
FIG. 1 illustrates a display device of a dual light guide plate control type that is one of technologies used for partial viewing angle adjustment in a liquid crystal display device.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the attached drawings.

FIG. 1 illustrates a display device of a dual light guide plate control type that is one of technologies used for partial viewing angle adjustment in a liquid crystal display device.

Referring to FIG. 1, as one type for partial viewing angle adjustment, a dual light guide plate control (DLC) structure using two or more light guide plates (LGP) and light sources can be used.

In the dual light guide plate control structure, as light guide plates included in a backlight unit, a first light guide plate and a second light guide plate disposed on an upper side thereof can be included. A first light source can be disposed on one side (a left side) of the first light guide plate, and a second light source can be disposed on the other side (a right side) of the second light guide plate.

In a share mode (privacy-off mode) having no partial viewing angle adjustment, both the two light sources and both the two light guide plates are used. In other words, light emitted from the first light source and light emitted from the second light source are respectively diffused in the first light guide plate and the second light guide plate and display a video with a wide angle toward an array substrate side of a display panel.

On the other hand, in a mode (privacy-on mode) requiring partial viewing angle adjustment limiting a light output to the left side, the second light source is off, and only the first light source is on. Thus, light emitted from the first light source is diffused in the first light guide plate and is emitted more strongly to the right side.

In accordance therewith, a light output for the left side is restricted, and thus partial viewing angle adjustment can be performed.

When such a DLC structure is used, only one light source is used in a mode (privacy mode) in which partial viewing angle adjustment is performed, and thus the whole luminance can be reduced.

In addition, in the DLC structure, a plurality of light guide plates need to be used, it is difficult to implement a large display panel due to limitation of a light diffusion performance of the light guide plates, a difference in the luminance between left and right sides of the display panel is visually recognized at the time of the partial viewing angle adjustment mode, and thus image quality can deteriorate.

Figure 2:
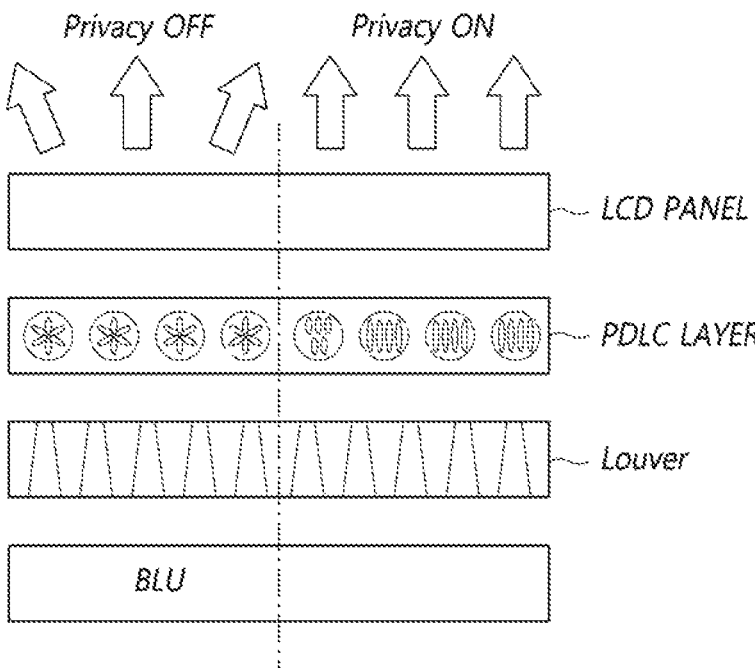
FIG. 2 illustrates a display device using a polymer dispersed liquid crystal (PDLC) that is one of technologies used for partial viewing angle adjustment in a liquid crystal display device.

FIG. 2 illustrates a display device using a polymer dispersed liquid crystal (PDLC) that is one of technologies used for partial viewing angle adjustment in a liquid crystal display device.

In the liquid crystal display device of the partial viewing angle adjustment type using the PDLC as illustrated in FIG. 2, a backlight unit, a louver, a PDLC layer, and a display panel disposed on an upper side thereof are disposed from the bottom.

In the PDLC layer, polymer dispersed liquid crystal (PDLC) is disposed. The PDLC represents a liquid crystal element exhibiting a scattering phenomenon due to a refractive index difference between a polymer and liquid crystal in a state in which the liquid crystal is dispersed in the polymer.

More specifically, the PDLC is produced in a form in which droplets of liquid crystal of which a diameter is several micrometers are dispersed in a polymer film having a thickness of several tens of micrometers. Then, when an electric field is applied thereto, directors of the liquid crystal are set to the direction of the electric field. At this time, when an ordinary refractive index of the liquid crystal coincides with a refractive index of the polymer, light is transmitted therethrough, and the liquid crystal becomes transparent. When the electric field is eliminated, the directors of the liquid crystal are disorderly distributed in accordance with interface effects with the polymer, and thus an effective refractive index of the liquid crystal becomes different from the refractive index of the polymer, whereby light is scattered.

More specifically, in a wide angle mode (a privacy-off mode or a share mode), no electric field is applied to the PDLC, and light from the backlight unit is scattered or diffused and thus is emitted with a wide angle (a left part in FIG. 2).

In addition, in a narrow angle mode or a viewing angle adjustment mode, the liquid crystal is aligned by applying an electric field to the PDLC, and thus light from the backlight unit is emitted with being concentrated on an upper side of the liquid crystal display device. Thus, a narrow angle mode in which a video is not visually recognized at a side-face viewing angle of the liquid crystal display device is implemented (a right part in FIG. 2).

According to the partial viewing angle adjustment type using the PDLC as illustrated in FIG. 2, a high-voltage power supply (>36 V) is used for driving the PDLC, and thus the power consumption can increase, and a thickness of the display device can be enlarged due to bonding of the louver and the PDLC layer.

Figure 3:
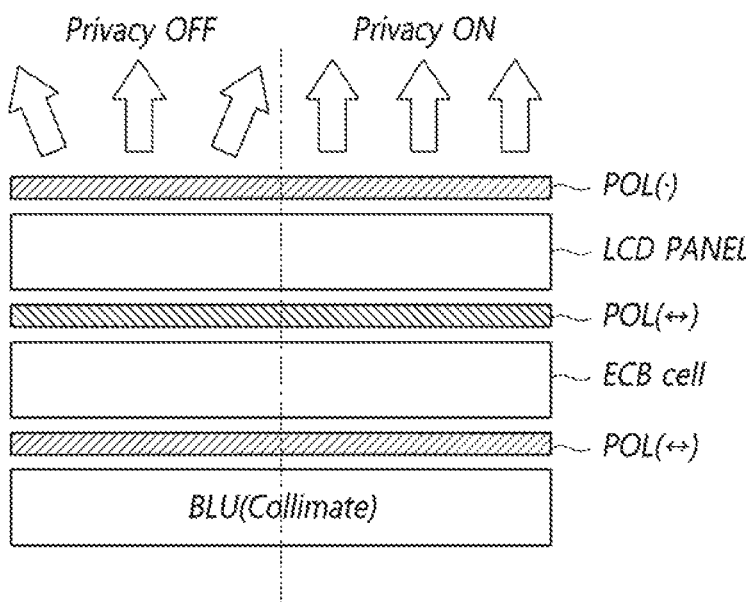
FIG. 3 illustrates a display device using electrically-controlled birefringence (ECB) liquid crystal that is one of technologies used for partial viewing angle adjustment in a liquid crystal display device.

FIG. 3 illustrates a display device using electrically-controlled birefringence (ECB) liquid crystal that is one of technologies used for partial viewing angle adjustment in a liquid crystal display device.

A liquid crystal display device of a viewing angle adjustment type using the electrically-controlled birefringence (ECB) liquid crystal as illustrated in FIG. 3 includes a backlight unit of a collimate type and an ECB cell layer including ECB liquid crystal disposed on an upper side thereof, and a display panel is disposed on an upper side of the ECB cell layer. In addition, between the backlight unit and the ECB cell layer and/or between the ECB cell layer and the liquid crystal display panel, polarization plates can be disposed.

The ECB cell layer can change the transmittance of light by adjusting a degree of birefringence of liquid crystal cells by vertically/horizontally orienting arrangement of liquid crystal molecules in accordance with a magnitude of an applied voltage.

In a structure using the ECB liquid crystal illustrated in FIG. 3, in the wide angle mode (the privacy-off mode or the share mode), by horizontally orienting the liquid crystal by adjusting a voltage applied to the ECB liquid crystal layer, light from the backlight unit is scattered or diffused to be emitted with a wide angle (a left part in FIG. 3).

On the other hand, in the narrow-angle mode or the viewing angle adjustment mode, by vertically orienting the ECB liquid crystal by adjusting the voltage applied to the ECB liquid crystal layer, light from the backlight unit is emitted with being concentrated on an upper side of the liquid crystal display device. Thus, the narrow-angle mode in which a video is not visually recognized at a side-face viewing angle of the liquid crystal display device is implemented (a right part in FIG. 3).

In a viewing angle adjustment type using such ECB liquid crystal, it is difficult to make fine adjustment of a voltage applied to the ECB liquid crystal, and thus it can be difficult to optimize horizontal luminance of the display panel at the time of the partial viewing angle adjustment mode. In addition, in a case in which a degree of change of the birefringence rate of the ECB liquid crystal is not high, a luminance blocking effect for a specific direction (for example, a driver-side direction) can be degraded.

As illustrated in FIGS. 1 to 3, although each of the DLC structure, the structure using the PDLC, and the structure using the ECB liquid crystal can provide a function for limiting a viewing angle to a specific direction in a liquid crystal display device, there are various limitations.

Thus, in the present disclosure, a liquid crystal display device with partial viewing angle adjustment capable of effectively controlling output of light in a specific direction only in a partial area in a large-screen display device while having superior image quality and low power consumption is to be proposed.

Figure 4:
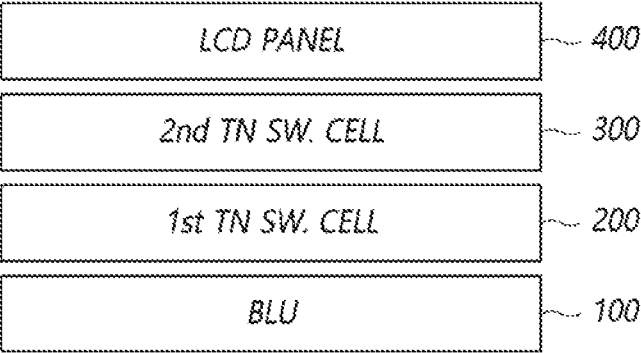
FIG. 4 illustrates a cross-section of a liquid crystal display device according to one embodiment of the present disclosure.

FIG. 4 illustrates a cross-section of a liquid crystal display device according to one embodiment of the present disclosure.

Referring to FIG. 4, the liquid crystal display device according to one embodiment of the present disclosure can include a backlight unit (100), a switching unit that is disposed on an upper side of the backlight unit and include dual TN switching cells, and a liquid crystal display panel (400) as an image display layer disposed on an upper side of the switching unit. All components of each liquid crystal display device according to all embodiments of the present disclosure are operatively coupled and configured.

As the dual TN switching cells of the switching unit, a first TN switching cell (200) and a second TN switching cell (300) disposed on an upper side of the first TN switching cell (200) can be included. The first TN switching cell (200) and the second TN switching cell (300) are disposed on an upper side of the backlight unit BLU (100) and can change light transmittance in a first direction between a first mode and a second mode.

Hereinafter, in this specification, the first mode is a wide viewing angle mode in which light is output with a wide angle. Such a first mode can be represented as a wide viewing angle mode, a share mode, a privacy-off mode, or the like.

In addition, the second mode is a narrow viewing angle mode in which advancement of light in a specific first direction (for example, a driver direction of a vehicle) is blocked. The second mode can be represented as a narrow viewing angle mode and, in a case in which this embodiment is applied to a display device for a vehicle, it can be represented as a privacy-on mode.

In addition, a first polarization plate disposed between the backlight unit (100) and the first TN switching cell (200), a second polarization plate disposed between the first TN switching cell (200) and the second TN switching cell (300), and a third polarization plate disposed between the second TN switching cell (300) and the liquid crystal display panel (400) can be further included.

Each of the first polarization plate to the third polarization plate can have a linear polarization characteristic for a predetermined angle. This will be described below in more detail with reference to FIGS. 7 to 9.

In addition, a fourth polarization plate disposed on an upper side of the liquid crystal display panel can be further included.

Furthermore, the liquid crystal display device according to this embodiment can further include a half-wave plate (HWP) film disposed between two polarization plates.

In addition, each of the first TN switching cell (200) and the second TN switching cell (300) can include an upper liquid crystal layer and a lower liquid crystal layer having predetermined orientation angles and an upper TN cell electrode and a lower TN cell electrode that are disposed on one sides of the upper liquid crystal layer and the lower liquid crystal layer and are used for applying an electric field to the liquid crystal layer. A detailed configuration of the first TN switching cell (200) and the second TN switching cell (300) will be described below in more detail with reference to FIG. 5.

The liquid crystal display panel (400) as an image display layer used in the liquid crystal display device according to this embodiment can be a liquid crystal display panel of an in-pane switching (IPS) type in which pixel electrodes and common electrodes are disposed on the same plane of an array substrate or a horizontal field type.

A detailed configuration of the liquid crystal display panel (400) of the IPS type will be described below in more detail with reference to FIG. 6.

In the liquid crystal display device with partial viewing angle adjustment according to this embodiment, a triple cell structure including two TN switching cells and an image cell (a liquid crystal display panel) of an IPS type disposed on an upper side thereof is included.

By having the triple cell structure including such two TN switching cells and one image cell, a light output for a first direction can be effectively blocked in the second mode in which partial viewing angle blocking is necessary, and this will be described below in more detail with reference to FIGS. 7 to 15.

The liquid crystal display device according to this embodiment can be a display device for a vehicle. In such a case, the liquid crystal display device according to this embodiment can include a cluster display area disposed on a side in front of a driver's seat, a co-driver's seat display area (CDD) disposed on a side in front of a co-driver's seat, and a center display area (CID) disposed between the cluster display area described above and the co-driver's seat display area (CDD) described above.

In such a case, the wide viewing angle mode or the first mode can be a share mode operating under the condition of vehicle stopping, and the narrow viewing angle mode or the second mode can be a privacy (on) mode operating under the condition of vehicle driving.

In the second mode or the privacy-on mode, for safety of vehicle driving, a video of the co-driver's seat display area (CDD) among three display areas of the liquid crystal display device needs to be not visually recognized by a driver. In other words, in the liquid crystal display device according to this embodiment, the first TN switching cell (200) and the second TN switching cell (300) having the partial viewing angle adjustment function can be disposed only in the co-driver's seat display area (CDD) described above.

In other words, in a case in which the liquid crystal display device according to this embodiment is used in a large-screen display device for a vehicle, the first TN switching cell (200) and the second TN switching cell (300) are disposed between the backlight unit of the co-driver's seat display area (CDD) and the liquid crystal display panel, and an amount of light emitted in the driver's seat direction out of light of the backlight unit emitted to the co-driver's seat display area (CDD) can be partly decreased.

Figure 5:
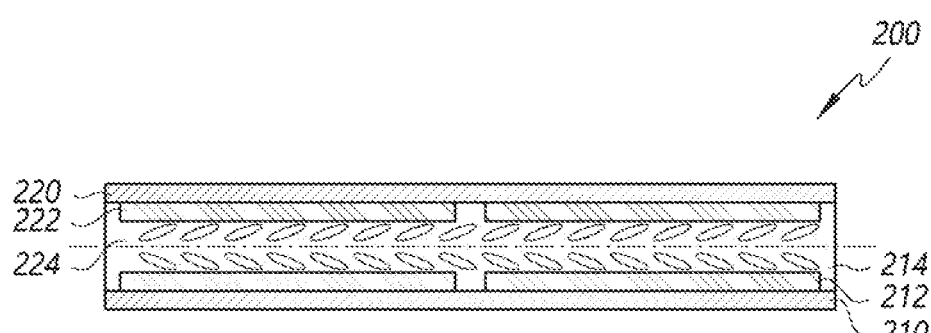
FIG. 5 illustrates an example of a cross-section of a TN switching cell used in embodiments of the present disclosure.

FIG. 5 illustrates an example of a cross-section of a TN switching cell used in embodiments of the present disclosure.

Referring to FIG. 5, the first TN switching cell (200) used in embodiments of the present disclosure can include an upper liquid crystal layer (224) and a lower liquid crystal layer (214) and an upper TN cell electrode (222) and a lower TN cell electrode (212) that are disposed on one sides of the upper liquid crystal layer (224) and the lower liquid crystal layer (214) and are used for applying an electric field to the liquid crystal layer. In addition, an upper substrate (220) supporting the upper TN cell electrode (222) and a lower substrate (210) supporting the lower TN cell electrode (212) can be further included. The upper substrate (220) and the lower substrate (210) can be films such as plastic thin films or flexible substrates. But embodiments of the present disclosure are not limited thereto.

Liquid crystal molecules oriented in a first direction can be included in the upper liquid crystal layer (224), and liquid crystal molecules oriented in a second direction can be included in the lower liquid crystal layer (214). At this time, the first direction and the second direction can be orthogonal to each other.

More specifically, the lower liquid crystal layer (214) can include liquid crystal molecules oriented in the direction of −45 degrees (in other words, the second direction is the direction of −45 degrees), and the upper liquid crystal layer (224) can include liquid crystal molecules oriented in the direction of +45 degrees (in other words, the first direction is the direction of +45 degrees).

As another example, the second direction that is an orientation direction of the lower liquid crystal layer (214) can be 0 degrees, and the first direction that is an orientation direction of the upper liquid crystal layer (224) can be 90 degrees.

The upper TN cell electrode (222) and the lower TN cell electrode (212) apply an electric field to liquid crystal molecules included in the upper/lower liquid crystal layers for aligning liquid crystal in a specific direction. The upper TN cell electrode (222) and the lower TN cell electrode (212) can be formed of a transparent conductive material such as indium tin oxide (ITO).

In addition, the second TN switching cell (300) according to this embodiment can also have a structure that is substantially similar to that illustrated in FIG. 5.

In the TN switching cell as illustrated in FIG. 5, a switching voltage having a predetermined electric potential difference can be applied to the upper TN cell electrode (222) and the lower TN cell electrode (212). The liquid crystal molecules included in the upper/lower liquid crystal layers (224, 214) can be aligned in a specific direction in accordance with application of a switching voltage, and, in accordance therewith, light incident from the backlight unit can be directed in a predetermined direction.

For example, the TN switching cell disposed in the co-driver's seat display area (CDD) can decrease an amount of light directed in a leftward direction of the co-driver's seat display area (for example, the driver's seat direction) out of light incident from the backlight unit.

Figure 6:
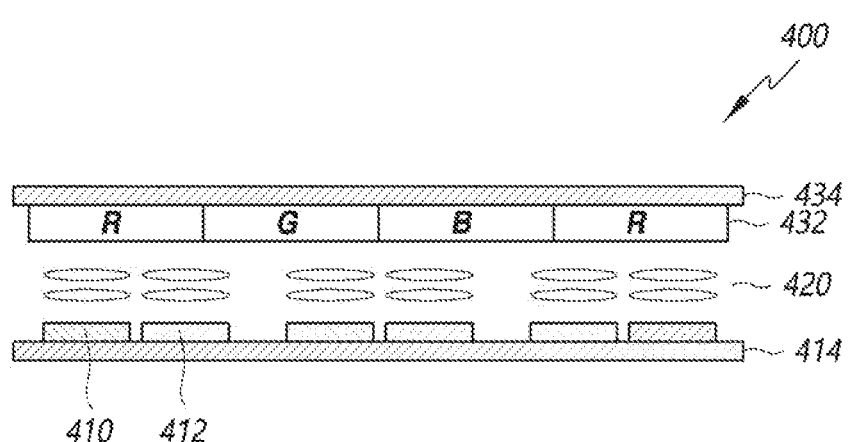
FIG. 6 illustrates an example of a cross-section of a liquid crystal display panel as an image display layer used in embodiments of the present disclosure.

FIG. 6 illustrates an example of a cross-section of a liquid crystal display panel as an image display layer used in embodiments of the present disclosure.

Referring to FIG. 6, a liquid crystal display panel (400) used in embodiments of the present disclosure can be a liquid crystal display panel of an in-plane switching (IPS) type in which pixel electrodes and common electrodes are disposed on the same plane of an array substrate or a vertical field type.

In other words, the liquid crystal display panel (400) according to this embodiment can include an array substrate (414) as a lower substrate, a color filter substrate (434) as an upper substrate, and a liquid crystal layer (420) disposed therebetween. At this time, liquid crystal included in the liquid crystal display panel (400) can be represented as an image cell.

On the color filter substrate (434), color filters (432) of respective colors R, G, and B can be formed.

In the array substrate (414), a thin film transistor layer including multiple thin film transistors can be formed.

On the thin film transistor layer, pixel electrodes (410) and common electrodes (412) used for adjusting an arrangement direction of the liquid crystal layer (420) can be formed on the same plane.

In addition, in the thin film transistor layer described above, gate lines, data lines, and thin film transistors are formed.

The gate lines and the data lines are disposed to intersect each other to define each pixel, and a thin film transistor is connected to the gate line and the data line inside the pixel. Such a thin film transistor is formed to include a gate electrode, a semiconductor layer, a source electrode, and a drain electrode. Other structures or layers can also be included.

The pixel electrode (410) and the common electrode (412) form a horizontal electric field therebetween, and the orientation direction of the liquid crystal layer (420) is adjusted in accordance with such a horizontal electric field. The pixel electrode (410) is connected to the thin film transistor described above.

The pixel electrode (410) and the common electrode (412) can be composed of indium tin oxide (ITO), indium zinc oxide (IZO), or the like that is a transparent conductive material but are not limited thereto.

Meanwhile, the pixel electrode (410) and the common electrode (412) adjusting the orientation direction of the liquid crystal layer (420) can have formation appearances variously changing in accordance with a liquid crystal driving type. As an example, in an in-plane switching (IPS) mode and a fringe field switching (FFS) mode, by forming all the pixel electrodes and the common electrodes on one substrate, a horizontal electric field is formed between the pixel electrode and the common electrode described above, and the orientation direction of a liquid crystal layer is adjusted using such a horizontal electric field.

On the other hand, in a twisted nematic (TN) mode and a vertical alignment (VA) mode, by forming pixel electrodes on one substrate and forming common electrodes on the other opposing substrate, a vertical electric field is formed between the pixel electrode and the common electrode, and the orientation direction of a liquid crystal layer is adjusted using such a vertical electric field.

Among such liquid crystal display types, the liquid crystal display panel (400) according to this embodiment can use the in-plane switching (IPS) type or a horizontal field type in which pixel electrodes and common electrodes are disposed on the same plane of an array substrate.

Generally, in the IPS type, liquid crystals are arrayed with major axes thereof maintained in a horizontal direction on the substrate surface, and there is a feature having a wide viewing angle characteristic.

Thus, by using the liquid crystal display panel (400) of the IPS type in this embodiment, there is an effect of securing a wide viewing angle in the wide viewing angle mode (the first mode).

However, a liquid crystal display panel used in embodiments of the present disclosure is not necessarily limited to the IPS type or the horizontal field type, and thus a liquid crystal display device of another type can be used.

In addition, a liquid crystal display panel used in embodiments of the present disclosure is not limited to the configuration illustrated in FIG. 6, and a liquid crystal display panel of another configuration can be used.

Figure 7:
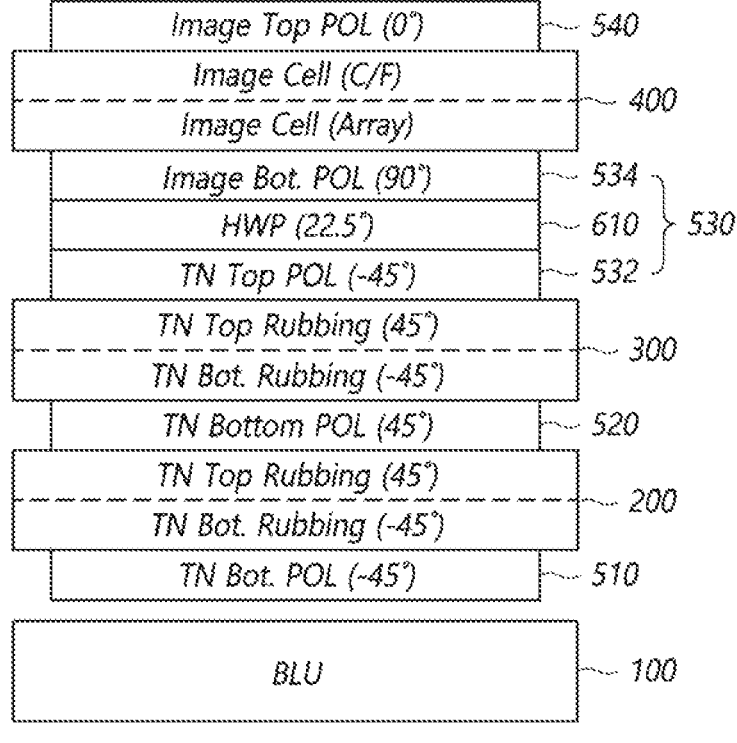
FIG. 7 illustrates a cross-section of a liquid crystal display device according to a first embodiment of the present disclosure.

FIG. 7 illustrates a cross-section of a liquid crystal display device according to a first embodiment of the present disclosure.

Referring to FIG. 7, the liquid crystal display device according to the first embodiment can include a switching unit including a first TN switching cell (200) disposed on a backlight unit (100) and a second TN switching cell (300) disposed on an upper side of the first TN switching cell and a liquid crystal display panel (400) as an image display layer disposed on an upper side of the switching unit.

As dual TN switching cells of the switching unit, the first TN switching cell (200) and the second TN switching cell (300) disposed on an upper side of the first TN switching cell can be included. Such a first TN switching cell (200) and a second TN switching cell (300) are disposed on an upper side of the backlight unit (100) and can change light transmittance in a first direction between the first mode and the second mode.

In the first embodiment, the first TN switching cell (200) can include an upper liquid crystal layer (TN Top Rubbing) oriented in the direction of 45°, an upper TN cell electrode, a lower liquid crystal layer (TN Bot. Rubbing) oriented in the direction of −45°, and a lower TN cell electrode.

In addition, the second TN switching cell (300) also can include an upper liquid crystal layer and a lower liquid crystal layer respectively oriented in directions of 45° and −45°, an upper TN cell electrode, and a lower TN cell electrode.

Furthermore, in the first embodiment, a first polarization plate (510) disposed between the backlight unit (100) and the first TN switching cell (200), a second polarization plate (520) disposed between the first TN switching cell (200) and the second TN switching cell (300), and a third polarization plate (530) disposed between the second TN switching cell (300) and the liquid crystal display panel (400) can be further included.

At this time, in the first embodiment, the third polarization plate (530) can include a (3-1)-th polarization plate (TN Top POL; 532) disposed on an upper side of the second TN switching cell (300) and a (3-2)-th polarization plate (Image Bot. POL; 534) disposed on a lower side of the liquid crystal display panel (400). In embodiments of the present disclosure, designation of the (3-1)-th polarization plate refers to a first plate of the third polarization plate, and designation of the (3-2)-th polarization plate refers to a second plate of the third polarization plate.

In addition, a first half-wave plate (HWP) film (610) can be further disposed between the (3-1)-th polarization plate (532) and the (3-2)-th polarization plate (534).

The half-wave film according to this embodiment is an optical member having a function of outputting incident light with a phase delayed by 90 degrees.

The first half-wave film (610) used in the first embodiment can have an optical axis direction of 22.5 degrees with respect to a reference direction.

Effects of such a half-wave film will be described below in more detail with reference to FIG. 11.

Meanwhile, in the first embodiment, the first polarization plate (510) and the (3-1)-th polarization plate (532) can have a linear polarization characteristic of −45°, the second polarization plate (520) can have a linear polarization characteristic of 45°, and the (3-2)-th polarization plate (534) can have a linear polarization characteristic of 90°.

In addition, according to the first embodiment, a fourth polarization plate (Image Top POL; 540) disposed on an upper side of the liquid crystal display panel can be further included, and the fourth polarization plate (540) can have a linear polarization characteristic of 0°.

In addition, the liquid crystal display panel (400) as an image display layer according to the first embodiment can be configured to include an array substrate in which common electrodes and pixel electrodes are disposed on the same plane and a color filter substrate disposed on an upper side thereof.

In the embodiment of the present disclosure of FIG. 7, the upper liquid crystal layer and the upper liquid crystal layer of the first TN switching cell 200 have respective rubbing directions separated by 90°, while the upper liquid crystal layer and the upper liquid crystal layer of the second TN switching cell 300 have respective rubbing directions separated by 90°. According to this arrangement, the first TN switching cell 200 and the second TN switching cell 300 can have the upper liquid crystal layers having the same rubbing directions, and the upper liquid crystal layers having the same rubbing directions. But the embodiments of the present disclosure are not limited thereto.

Also, the second polarization plate 520 can be interposed between the first TN switching cell 200 and the second TN switching cell 300, and can have the linear polarization characteristic of 45°. According to this arrangement, the value of the linear polarization characteristic of the second polarization plate 520 that is interposed between the first TN switching cell 200 and the second TN switching cell 300, have the same value of the rubbing direction of the upper liquid crystal layers of the first TN switching cell 200 and the second TN switching cell 300.

By using the liquid crystal display device according to the first embodiment illustrated in FIG. 7, as will be described below with reference to FIG. 10 and subsequent drawings, in the second mode that is a partial viewing angle blocking mode, light in a driver's seat direction (for example, the direction of −30 degrees) can be almost blocked.

More specifically, a ratio of the amount of light emitted in the direction of −30 degrees that is a left-side driver's seat direction to the amount of light emitted to the center (for example, the direction of 0 degrees) in the second mode that is a privacy-on mode can be about 3% or less.

In other words, according to the first embodiment, in a case in which the liquid crystal display device is used in a display device for a vehicle, light emitted in a driver's seat direction (the direction of −30 degrees) is only about 3% of light of the center or less in the second mode, and thus, a strong viewing angle adjustment function causing a video to be hardly visually recognized from the driver's seat can be implemented.

This will be described below in more detail with reference to FIGS. 10, 13, and the like.

Figure 8:
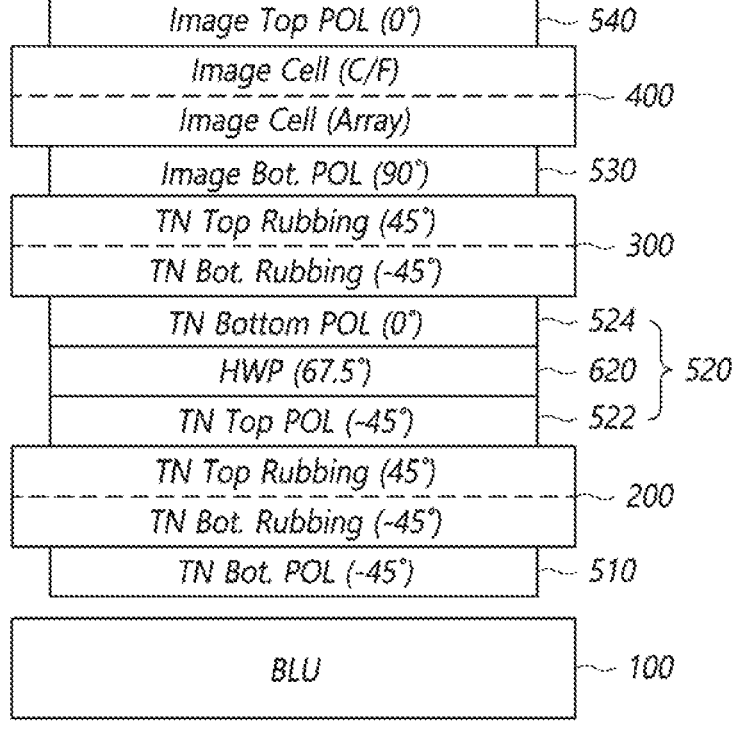
FIG. 8 illustrates a cross-section of a liquid crystal display device according to a second embodiment of the present disclosure.

FIG. 8 illustrates a cross-section of a liquid crystal display device according to a second embodiment of the present disclosure.

Referring to FIG. 8, the liquid crystal display device according to the second embodiment can include a switching unit including a first TN switching cell (200) disposed on a backlight unit (100) and a second TN switching cell (300) disposed on an upper side of the first TN switching cell and a liquid crystal display panel (400) as an image display layer disposed on an upper side of the switching unit.

A dual TN switching cell structure of the switching unit is the same as that described with reference to FIG. 7, and thus, in order to avoid duplication, detailed description thereof will be omitted.

In the second embodiment, the first TN switching cell (200) can include an upper liquid crystal layer (TN Top Rubbing) oriented in the direction of 45°, an upper TN cell electrode, a lower liquid crystal layer (TN Bot. Rubbing) oriented in the direction of −45°, and a lower TN cell electrode.

In addition, the second TN switching cell (300) also can include an upper liquid crystal layer and a lower liquid crystal layer respectively oriented in directions of 45° and −45°, an upper TN cell electrode, and a lower TN cell electrode.

Furthermore, in the second embodiment, a first polarization plate (TN Bot. POL; 510) disposed between the backlight unit (100) and the first TN switching cell (200), a second polarization plate (520) disposed between the first TN switching cell (200) and the second TN switching cell (300), and a third polarization plate (Image Bot. POL; 530)

disposed between the second TN switching cell (300) and the liquid crystal display panel (400) can be further included.

In this case, in the second embodiment, the second polarization plate (530) can include a (2-1)-th polarization plate (TN Top POL; 522) disposed on an upper side of the first TN switching cell (200) and a (2-2)-th polarization plate (TN Bot. POL; 524) disposed on a lower side of the second TN switching cell (300). In embodiments of the present disclosure, designation of the (2-1)-th polarization plate refers to a first plate of the second polarization plate, and designation of the (2-2)-th polarization plate refers to a second plate of the second polarization plate.

In addition, a second half-wave plate (HWP) film (620) can be further disposed between the (2-1)-th polarization plate (522) and the (2-2)-th polarization plate (524).

The half-wave film according to this embodiment is an optical member having a function of outputting incident light with a phase delayed by 90 degrees.

The first half-wave film (610) used in the second embodiment can have an optical axis direction of 67.5 degrees with respect to a reference direction.

Meanwhile, in the second embodiment, the first polarization plate (510) can have a linear polarization characteristic of +45°, the (2-1)-th polarization plate (522) can have a linear polarization characteristic of −45°, the (2-2)-th polarization plate (524) can have a linear polarization characteristic of 0°, and the third polarization plate (530) can have a linear polarization characteristic of 90°.

In addition, according to the second embodiment, a fourth polarization plate (Image Top POL; 540) disposed on an upper side of the liquid crystal display panel can be further included, and the fourth polarization plate (540) can have a linear polarization characteristic of 0°.

In the embodiment of the present disclosure of FIG. 8, the upper liquid crystal layer and the upper liquid crystal layer of the first TN switching cell 200 have respective rubbing directions separated by 90°, while the upper liquid crystal layer and the upper liquid crystal layer of the second TN switching cell 300 have respective rubbing directions separated by 90°. According to this arrangement, the first TN switching cell 200 and the second TN switching cell 300 can have the upper liquid crystal layers having the same rubbing directions, and the upper liquid crystal layers having the same rubbing directions. But the embodiments of the present disclosure are not limited thereto.

Also, the second polarization plate 520 can be interposed between the first TN switching cell 200 and the second TN switching cell 300, and can have the (2-1)-th polarization plate 522 having the linear polarization characteristic of −45°. According to this arrangement, the value of the linear polarization characteristic of the (2-1)-th polarization plate 522 that is interposed between the first TN switching cell 200 and the second TN switching cell 300, have the same value of the rubbing direction of the upper liquid crystal layers of the first TN switching cell 200 and the second TN switching cell 300.

By using the liquid crystal display device according to the second embodiment illustrated in FIG. 8, as will be described below with reference to FIG. 10 and subsequent drawings, in the second mode that is a partial viewing angle blocking mode, light in a driver's seat direction (for example, the direction of −30 degrees) can be almost blocked.

In other words, similar to the first embodiment, according to the second embodiment illustrated in FIG. 8, light emitted in the driver's seat direction (the direction of −30 degrees) is only about 3% of light of the center or less in the second mode, and thus, a strong viewing angle adjustment function causing a video to be hardly visually recognized from the driver's seat can be implemented.

Figure 9:
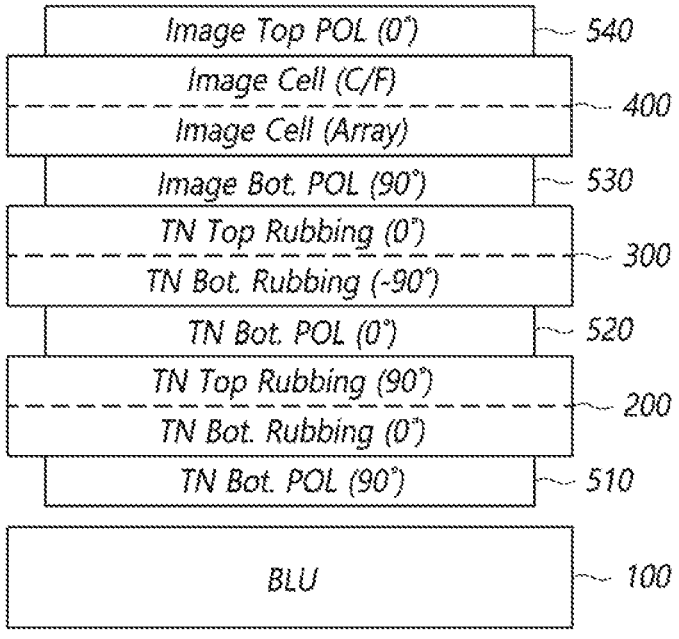
FIG. 9 illustrates a cross-section of a liquid crystal display device according to a third embodiment of the present disclosure.

FIG. 9 illustrates a cross-section of a liquid crystal display device according to a third embodiment of the present disclosure.

Referring to FIG. 9, the liquid crystal display device according to the third embodiment can include a switching unit including a first TN switching cell (200) disposed on a backlight unit (100) and a second TN switching cell (300) disposed on an upper side of the first TN switching cell and a liquid crystal display panel (400) as an image display layer disposed on an upper side of the switching unit.

A dual TN switching cell structure of the switching unit is the same as that described with reference to FIGS. 7 and 8, and thus, in order to avoid duplication, detailed description thereof will be omitted.

In the third embodiment, the first TN switching cell (200) can include a lower liquid crystal layer (TN Bot. Rubbing) oriented in the direction of 0°, a lower TN cell electrode, an upper liquid crystal layer (TN Top Rubbing) oriented in the direction of 90°, and an upper TN cell electrode.

In addition, the second TN switching cell (300) can include a lower liquid crystal layer (TN Bot. Rubbing) oriented in the direction of −90°, a lower TN cell electrode, an upper liquid crystal layer (TN Top Rubbing) oriented in the direction of 0°, and an upper TN cell electrode.

Furthermore, in the third embodiment, a first polarization plate (TN Bot. POL; 510) disposed between the backlight unit (100) and the first TN switching cell (200), a second polarization plate (520) disposed between the first TN switching cell (200) and the second TN switching cell (300), a third polarization plate (Image Bot. POL; 530) disposed between the second TN switching cell (300) and the liquid crystal display panel (400) can be further included, and a fourth polarization plate (Image Top POL; 540) disposed on an upper side of the liquid crystal display panel (400) can be further included.

In the third embodiment, the first polarization plate (510) and the third polarization plate (530) can have a linear polarization characteristic of +90° and the second polarization plate (520) and the fourth polarization plate (540) can have a linear polarization characteristic of +0°.

In the embodiment of the present disclosure of FIG. 9, the upper liquid crystal layer and the upper liquid crystal layer of the first TN switching cell 200 have respective rubbing directions separated by 90°, while the upper liquid crystal layer and the upper liquid crystal layer of the second TN switching cell 300 have respective rubbing directions separated by 90°. According to this arrangement, the upper liquid crystal layer of the first TN switching cell 200 and the upper liquid crystal layer of the second TN switching cell 300 having the same rubbing directions, and the upper liquid crystal layer of the first TN switching cell 200 and the upper liquid crystal cell of the second TN switching cell 300 having respective rubbing directions separated by 90°. But the embodiments of the present disclosure are not limited thereto.

Also, the second polarization plate 520 can be interposed between the first TN switching cell 200 and the second TN switching cell 300, and can have the linear polarization characteristic of 0°. According to this arrangement, the value of the linear polarization characteristic of the second polarization plate that is interposed between the first TN switching cell 200 and the second TN switching cell 300, have the same value of the rubbing directions of the upper liquid crystal layer of the first TN switching cell 200 and the upper liquid crystal layer of the second TN switching cell 300.

By using the liquid crystal display device according to the third embodiment illustrated in FIG. 9, as will be described below with reference to FIG. 10 and subsequent drawings, in the second mode that is a partial viewing angle adjustment mode, light in a driver's seat direction (for example, the direction of −30 degrees) can be almost blocked.

In other words, similar to the first embodiment and the second embodiment, according to the third embodiment illustrated in FIG. 9, light emitted in the driver's seat direction (the direction of −30 degrees) is only about 3% of light of the center or less in the second mode, and thus, a strong viewing angle adjustment function causing a video to be hardly visually recognized from the driver's seat can be implemented.

As described above, in the first embodiment to the third embodiment of the present disclosure, a liquid crystal display device having a triple cell structure including two TN switching cells and one image cell (a liquid crystal display layer of the IPS type) is provided.

In addition, between respective cells, multiple polarization plates having peculiar linear polarization characteristics can be disposed.

Furthermore, between two polarization plates adjacent to each other, first and second half-wave (HWP) film can be disposed.

Also, a polarization plate interposed between the two TN switching cells can have the value of the linear polarization characteristic that is the same value of the rubbing directions of one of the liquid crystal layer from each of the two TN switching cells.

As described above, in the triple cell structure, by disposing two TN switching cells and an image cell and selectively disposing a polarization plate and a half-wave film therebetween, a light output for a specific direction can be strongly inhibited in the narrow viewing angle mode (the second mode).

FIGS. 10A to 13 illustrate experiment results for viewing angle adjustment characteristics of the liquid crystal display device according to this embodiment.

Figure 10A:
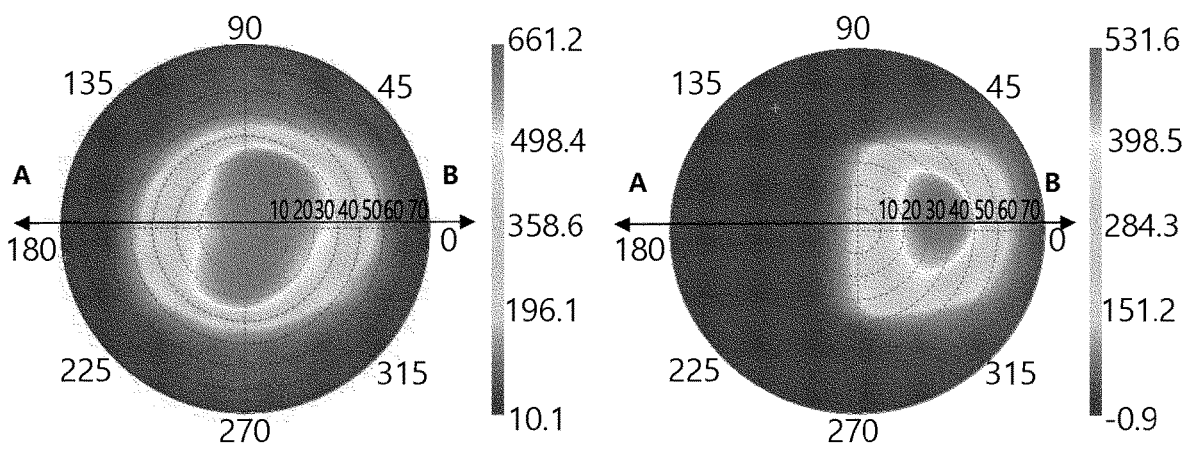
FIGS. 10A and 10B illustrate light distribution diagrams and optical output characteristics for each viewing angle in first and second modes of the liquid crystal display device according to the first embodiment illustrated in FIG. 7.
Figure 10B:
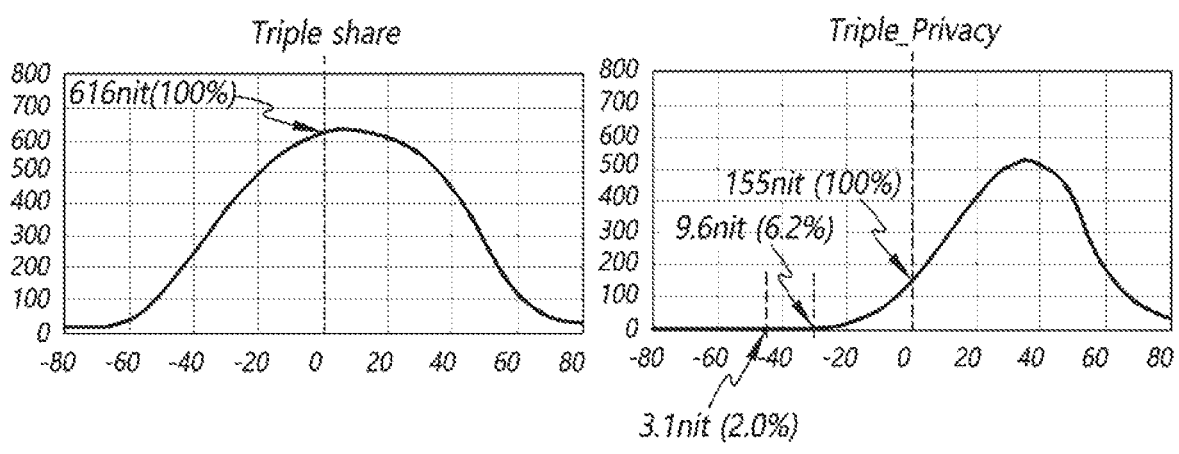

FIGS. 10A and 10B illustrate light distribution diagrams and optical output characteristics for each viewing angle in first and second modes of the liquid crystal display device according to the first embodiment illustrated in FIG. 7.

As illustrated on left sides of FIGS. 10A and 10B, when the liquid crystal display device according to the first embodiment illustrated in FIG. 7 is used, in the first mode that is a wide viewing angle mode, horizontally uniform luminance with reference to a center direction (for example, the direction of 0 degrees) as a reference is exhibited.

More specifically, luminance of about 616 nit is exhibited at the center (0 degrees) of a display area, and luminance of about 250 nit is exhibited also in the viewing angles of −40 degrees and +40 degrees.

Thus, in a case in which the liquid crystal display device is applied to a vehicle, a video of the CDD can be sufficiently visually recognized also at viewing angles of about −45 degrees to −30 degrees that are angles formed when a driver sees the screen of the co-driver's seat display area (CDD).

On the other hand, in a case in which a switching voltage is applied to both cell electrodes of the first and second TN switching cells (200, 300) in the first embodiment illustrated in FIG. 7, a narrow viewing angle mode (second mode) as illustrated on right sides of FIGS. 10A and 10B operates.

In this case, light incident from the backlight unit (100) is deflected to the right side while passing through the first and second TN switching cells (200, 300), and a light output for the left side is strongly inhibited.

As a result, as illustrated on right sides of FIGS. 10A and 10B, in the second mode (the privacy-on mode), an output light peak is deflected to a position of +30 degrees that is on the right side of the center (0 degrees) of the display area.

Thus, in the second mode (the privacy-on mode), luminance of about 155 nit is exhibited at the center (0 degrees) of the display area, and luminance of about 3.1 nit is exhibited at a right-side viewing angle of 44 degrees. In other words, in the second mode (the privacy mode), luminance at the viewing angle of −40 degrees that is a driver direction is about 3% of the center luminance or less.

Thus, in a case in which the liquid crystal display device according to the first embodiment is applied to a vehicle, in the second mode (privacy mode), the driver hardly visually recognizes a video displayed in the co-driver's seat display area (CDD).

FIGS. 11A and 11B are diagrams illustrating effects according to use of a half wavelength (HWP) film used in the embodiment of the present disclosure.

As described above, in each of the first embodiment and the second embodiment illustrated in FIGS. 7 and 8, the half-wave (HWP) film can be disposed between two polarization plates that are adjacent to each other.

In other words, in the first embodiment illustrated in FIG. 7, the first half-wave (HWP) film (610) can be disposed between the (3-1)-th polarization plate (532) and the (3-2)-th polarization plate (534).

FIG. 11A illustrates light distribution diagrams in the first mode in a case in which the first half-wave film (610) is used (w/HWP) and a case in which the first half-wave film (610) is not used (w/o HWP) in the embodiment illustrated in FIG. 7.

As illustrated in FIG. 11A, in a case in which the first half-wave film (610) is used, an effect of raising the luminance of a center area in the wide viewing angle mode (the first mode) can be provided. For example, as illustrated in FIG. 11A, it can be understood that, by using the first half-wave film (610), the luminance of the center area can be improved by about 100 nit or more.

On the other hand, FIG. 11B illustrates light distribution diagrams in the second mode in a case in which the first half-wave film (610) is used (w/HWP) and a case in which the first half-wave film (610) is not used (w/o HWP) in the embodiment illustrated in FIG. 7.

As illustrated in FIG. 11B, in the case in which the first half-wave film (610) is used, an effect of shifting a light distribution curve in the second mode to the left side is provided.

As a result, the luminance at the center area (for example, the direction of 0 degrees) in the second mode (the privacy mode) can be increased, and this increases the luminance for the co-driver's seat direction in the second mode (the privacy mode) is increased, and the visibility can be improved.

In other words, according to one embodiment of the present disclosure, in the triple cell structure including two TN switching cells and one image cell (a liquid crystal display layer of the IPS type), one or more half-wave (HWP) films can be disposed between polarization plates adjacent to each other. In accordance therewith, an effect of raising center luminance of the display area in the wide viewing angle mode (the first mode) and the narrow viewing angle mode (the second mode) can be provided.

Figure 12A:
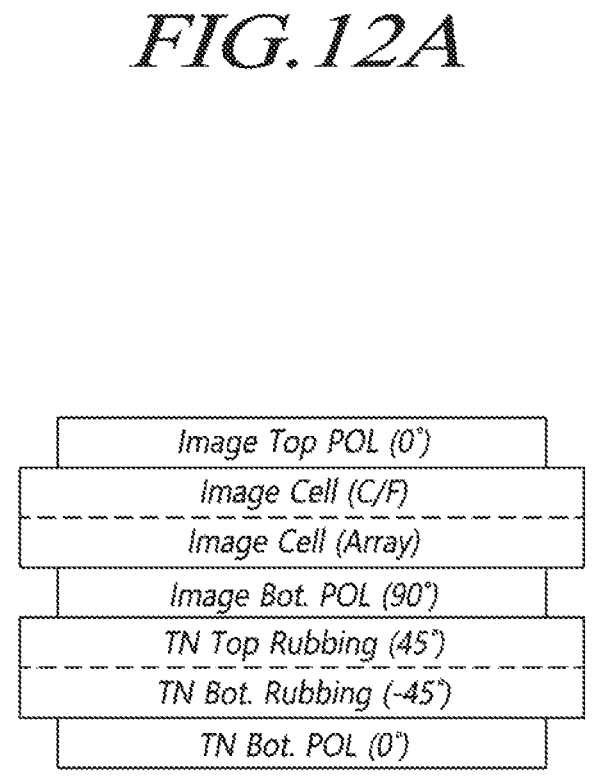

FIGS. 12A to 12C illustrate cross-sections of liquid crystal display devices according to first to third comparative examples of the present disclosure for comparison with embodiments of the present disclosure, and FIG. 13 is experiment data illustrating effects of partial viewing angle adjustment characteristics according to the first to third embodiments of the present disclosure compared with those of the first to third comparative examples illustrated in FIG. 10.

For comparisons with the first embodiment to the third embodiment illustrated in FIGS. 7 to 9, in FIGS. 12A to 12C, liquid crystal display devices according to Comparison example 1 to Comparison example 3 were manufactured, and partial viewing angle adjustment performances thereof were compared with each other.

Comparative example 1 (FIG. 12A) has a dual cell structure including one TN switching cell and one image cell in which three polarization plates are disposed on upper and lower sides of each cell.

Comparative example 2 (FIG. 12B) has a dual cell structure including one TN switching cell and one image cell in which two polarization plates are disposed between the TN switching cell and the image cell, and a half-wave film is disposed therebetween.

Comparative example 3 (FIG. 12C) has a triple cell structure including one TN switching cell, an ECB liquid crystal cell, and one image cell. In addition, in Comparative example 3, a polarization plate is disposed between respective cells, and particularly, a half-wave film is disposed on a lower side of the ECB liquid crystal cell.

As illustrated in FIG. 13, according to Comparative examples 1 to 3, in the second mode (privacy mode), when the front-side (center) luminance is used as a reference of 100%, luminance of about 1.0% or less is exhibited at the viewing angle of right-side −30 degrees, and relatively superior right-side viewing angle blocking performance is exhibited (in other words, Comparative example 1 exhibits 1.0% at the viewing angle of −30 degrees with respect to the center, and Comparative example 2 exhibits 0.9%, and Comparative example 3 exhibits 1.1%).

However, it can be understood that a luminance reversal phenomenon in which, at the viewing angle of −45 degrees or −70 degrees that is a further right side, the luminance increases more than the luminance at the viewing angle of −30 degrees occurs. For example, in the case of Comparative example 2, while the luminance at −30 degrees (with reference to the center) is 0.9%, the luminance at −45 degrees and the luminance at −70 degrees rather increase to be 7.2 and 5.4.

This suggests a possibility of a video of the co-driver's seat display area being visually recognized when seen from the driver's seat direction, and thus the light blocking characteristic is degraded more or less at a high viewing angle in Comparative examples 1 to 3.

On the other hand, in cases of the first embodiment to the third embodiment as illustrated in FIGS. 7 to 9, in the second mode (privacy mode), when the front-side (center) luminance is set as a reference of 100%, luminance of about 1.0% or less is exhibited at the viewing angle of right-side −30 degrees, and superior right-side viewing angle blocking performance is exhibited. In addition, according to the first embodiment to the third embodiment as illustrated in FIGS. 7 to 9, it can be understood that the luminance reversal phenomenon appearing in Comparative examples 1 to 3 hardly appears.

In other words, for example, according to the second embodiment (FIG. 8), in the second mode (privacy mode), when the front-side (center) luminance is used as a reference of 100%, luminance values at viewing angles of right-side −30 degree, −45 degrees, and −70 degrees are respectively 1.1%, 0%, and 0%, which represent almost perfect right-side viewing angle blocking performance.

Thus, by using a liquid crystal display device having the triple cell structure according to embodiments of the present disclosure, light traveling in the driver's seat direction (for example, a direction of −30 degrees or more) can be almost blocked in the second mode that is a partial viewing angle blocking mode.

Thus, a strong viewing angle adjustment function causing a video of the co-driver's seat display area (CDD) not to be visually recognized from the driver's seat can be implemented, and thus, in a case in which the liquid crystal display device is used in a large-screen display for a vehicle, vehicle driving safety can be secured.

Figure 14:
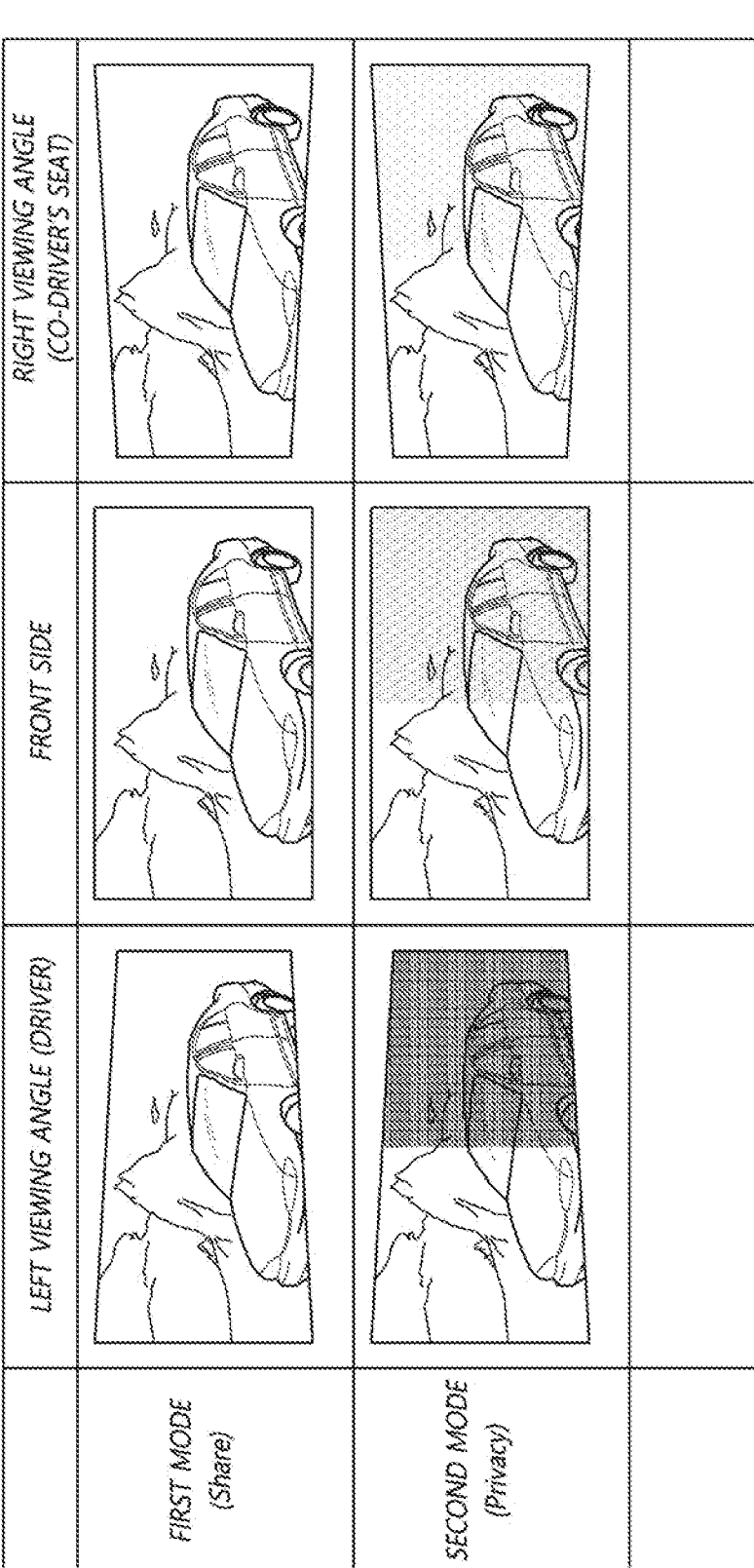
FIG. 14 illustrates an example of screens of a vehicle display device in a share mode (first mode) and a privacy mode (second mode) of a case in which embodiments of the present disclosure are applied.

FIG. 14 illustrates an example of screens of a vehicle display device in a share mode and a privacy mode of a case in which embodiments of the present disclosure are applied.

FIG. 14 illustrates one example of screens seen from a driver's seat, the center, and a co-driver's seat in a first mode (the share mode, the wide viewing angle mode, the privacy-off mode) and a second mode (the privacy mode, the narrow viewing angle mode) in a case in which the liquid crystal display device according to embodiments of the present disclosure is implemented as a large-screen display for a vehicle.

As illustrated in the drawing, a video of almost uniform luminance from all the driver's seat (a left viewing angle), the center, and the co-driver's seat (the right viewing angle) can be seen in the first mode.

On the other hand, in the second mode, a video in which luminance of a rights-side area of the display panel (for example, the CDD) is slightly lower than that of the left side can be visually recognized from the co-driver's seat (a right viewing angle). It can be understood that the luminance of the CDD is further lowered at the center, and a video of a right-side area of the display panel (for example, the CDD) is hardly visually recognized from the driver's seat (a left viewing angle).

Thus, the liquid crystal display device according to embodiments of the present disclosure can be implemented as a large-screen display for a vehicle including a cluster display area, a center display area (CID), and a co-driver's seat display area (CDD). In this case, a strong viewing angle adjustment function causing a video of the co-driver's seat display area (CDD) not to be visually recognized from the driver's seat can be implemented, and in accordance therewith, vehicle driving safety can be secured.

Figure 15:
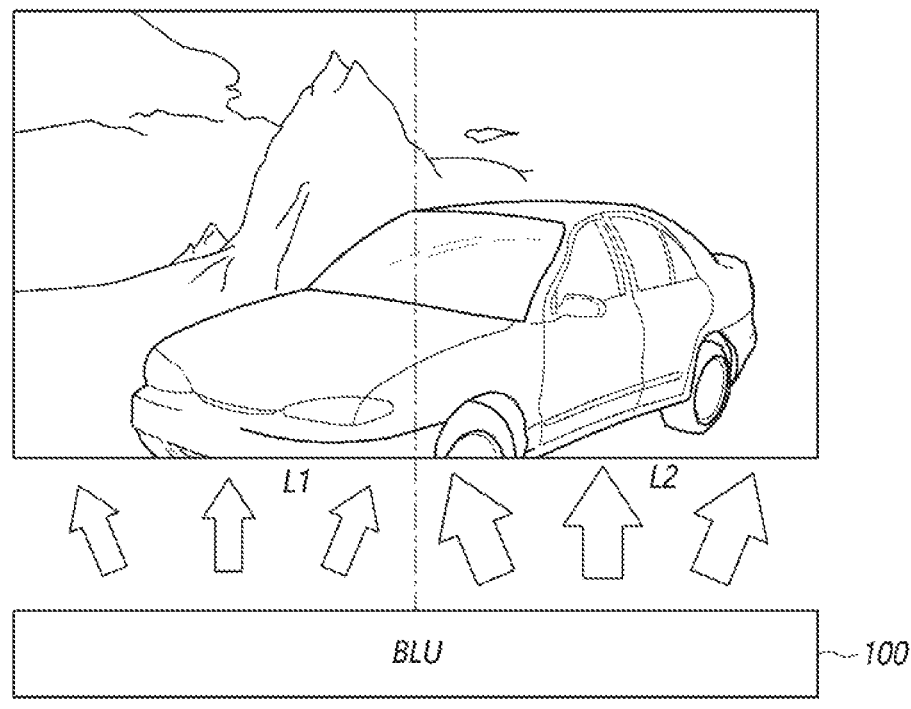
FIG. 15 illustrates a light amount changeable provision configuration of a backlight unit in a privacy mode (second mode).

FIG. 15 illustrates a light amount changeable provision configuration of a backlight unit in a privacy mode (second mode).

As described above, in the case of the liquid crystal display device according to embodiments of the present disclosure, the luminance of the co-driver's seat display area (CDD) decreases in the second mode (privacy mode).

In this case, separately from the video blocking effect for a driver's seat, there can occur problems in which the luminance of the CDD that is a right-side area of the display panel is lowered also in a screen seen by a passenger present on the co-driver's seat or a rear seat, and an abrupt luminance change is visually recognized on a boundary for the left-side area.

Thus, in order to solve the problems of luminance lowering and visual recognition of the boundary in the second mode (privacy mode), a function of the backlight unit providing stronger light for the co-driver's seat display area (CDD) than for the cluster display area described above at the time of operating in the second mode can be provided.

In other words, as illustrated in FIG. 15, in the second mode (privacy mode), the backlight unit (100) can provide a function of compensating for the amount of light such that the amount of light (L2) of the right-side area is larger than the amount of light (L1) of the left-side area.

More specifically, the horizontal light amount compensation function described above can be provided by configuring a density or an output of light source chips disposed in the right-side area to be larger than a density or an output of light source chips disposed on the left-side area of the backlight unit in a case in which the backlight unit is a direct type including multiple light source chips (LEDs).

In addition, in a case in which the backlight unit has a structure in which plane light sources and light guide plates are used, by changing arrangement/no-arrangement, the density, the shape, and the like of a light condensing pattern such as a prism pattern formed in a light guide plate or a reflection plate, the output light of the backlight right-side area can be configured to be stronger.

In addition, in a case in which the backlight unit has a structure in which plane light sources and light guide plates are used, by disposing a plurality of light source on left and right sides and selectively turning on/off right-side light sources, the horizontal light amount compensation function described above can be provided.

As described above, according to the embodiments of the present disclosure, by providing a liquid crystal display device having a triple cell structure including two TN switching cells and one image cell, a light output for the first direction can be effectively blocked in the second mode in which partial viewing angle blocking is necessary.

In addition, the liquid crystal display device according to the embodiments of the present disclosure can be implemented as a large-screen display for a vehicle including a cluster display area, a center display area (CID), and a co-driver's seat display area (CDD). In this case, a strong viewing angle adjustment function causing a video of the co-driver's seat display area (CDD) not to be visually recognized from the driver's seat can be implemented, and in accordance therewith, vehicle driving safety can be secured.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention.

What is claimed is:

1. A liquid crystal display device comprising:
   a backlight unit;
   a switching unit disposed on an upper side of the backlight unit, and including a first twisted nematic (TN) switching cell configured to change light transmittance for a first direction between a first mode and a second mode and a second twisted nematic (TN) switching cell disposed on an upper side of the first TN switching cell;

an image display layer disposed on an upper side of the switching unit;

a first polarization plate disposed between the backlight unit and the first TN switching cell;

a second polarization plate disposed between the first TN switching cell and the second TN switching cell; and a third polarization plate disposed between the second TN switching cell and a liquid crystal display panel as the image display layer, wherein the second polarization plate includes a (2-1)-th polarization plate disposed on the upper side of the first TN switching cell and a (2-2)-th polarization plate disposed on a lower side of the second TN switching cell.

2. The liquid crystal display device of claim 1, further comprising a fourth polarization plate disposed on an upper side of the liquid crystal display panel.

3. The liquid crystal display device of claim 1, wherein the third polarization plate includes a (3-1)-th polarization plate disposed on an upper side of the second TN switching cell and a (3-2)-th polarization plate disposed on a lower side of the liquid crystal display panel, wherein the liquid crystal display device further comprises a first half-wave plate (HWP) film disposed between the (3-1)-th polarization plate and the (3-2)-th polarization plate.

4. The liquid crystal display device of claim 3, wherein each of the first TN switching cell and the second TN switching cell includes upper and lower liquid crystal layers oriented at approximately 45° and −45°, an upper TN cell electrode, and a lower TN cell electrode.

5. The liquid crystal display device of claim 4, wherein the first polarization plate and the (3-1)-th polarization plate have a 45° linear polarization characteristic, the second polarization plate has a 45° linear polarization characteristic, and the (3-2)-th polarization plate has a 90° linear polarization characteristic.

6. The liquid crystal display device of claim 1, wherein the liquid crystal display device further comprises a second half wave plate (HWP) film disposed between the (2-1)-th polarization plate and the (2-2)-th polarization plate.

7. The liquid crystal display device of claim 6, wherein each of the first TN switching cell and the second TN switching cell includes upper and lower liquid crystal layers oriented at approximately +45° or −45°, respectively, an upper TN cell electrode, and a lower TN cell electrode.

8. The liquid crystal display device of claim 7, wherein the first polarization plate has a 45° linear polarization characteristic, the (2-1)-th polarization plate has a −45° linear polarization characteristic, the (2-1)-th polarization plate has a 0° linear polarization characteristic, and the third polarization plate has a 90° linear polarization characteristic.

9. The liquid crystal display device of claim 1, wherein the first TN switching cell includes upper and lower liquid crystal layers oriented at 90° and 0°, respectively, an upper TN cell electrode, and a lower TN cell electrode, and wherein the second TN switching cell includes upper and lower liquid crystal layers oriented at 0° and 90°, respectively, an upper TN cell electrode, and a lower TN cell electrode.

10. The liquid crystal display device of claim 9, wherein the first polarization plate and the third polarization plate have a 90° linear polarization characteristic, respectively, and the second polarization plate has a 0° linear polarization characteristic.

11. The liquid crystal display device of claim 1, wherein the image display layer includes the liquid crystal display panel of an in-plane switching (IPS) type in which pixel electrodes and common electrodes are disposed on a same plane of an array substrate.

12. The liquid crystal display device of claim 1, wherein the liquid crystal display device comprises a cluster display area on a side in front of a driver's seat, a co-driver's seat display area (CDD) on a side in front of a co-driver's seat, and a center display area (CID) disposed between the cluster display area and the co-driver's seat display area (CDD) as a display device for a vehicle, wherein the first mode is a wide viewing angle mode in which a first amount of light is output in directions of a driver's seat and a co-driver's seat, the second mode is a narrow viewing angle mode in which a second amount of light is output in the direction of the driver's seat, and the first direction is a direction toward the driver's seat, and wherein the first amount of light is greater than the second amount of light.

13. The liquid crystal display device of claim 12, wherein the wide viewing angle mode is a share mode operating under a vehicle stopping condition, and the narrow viewing angle mode is a privacy mode operating under a vehicle driving condition.

14. The liquid crystal display device of claim 12, wherein the backlight unit provides light that is greater for the co-driver's seat display area (CDD) than light for the cluster display area at a time of being operated in the second mode.

15. The liquid crystal display device of claim 12, wherein the first TN switching cell and the second TN switching cell are included only in the co-driver's seat display area (CDD).

16. The liquid crystal display device of claim 12, wherein only the co-driver's seat display area includes both the first TN switching cell and the second TN switching cell, and wherein the cluster display area and the center display area respectively include only one or none of the first TN switching cell and the second TN switching cell.

17. The liquid crystal display device of claim 1, wherein each of the first TN switching cell and the second TN switching cell includes upper and lower liquid crystal layers, an upper TN cell electrode, and a lower TN cell electrode, respectively, and wherein the second polarization plate has a value of a linear polarization characteristic that is the same as a value of a rubbing direction of one of the upper liquid crystal layer and the lower liquid crystal layer of the first TN switching cell, and a value of a rubbing direction of one of the upper liquid crystal layer and the lower liquid crystal layer of the second TN switching cell.

18. A liquid crystal display device comprising:

a backlight unit;

an image display layer;

a switching unit disposed between the backlight unit and the image display layer, and including a first twisted nematic (TN) switching cell and a second twisted nematic (TN) switching cell stacked together, and configured to have a partial viewing angle adjustment function, respectively; and a plurality of polarization plates disposed on the backlight unit, the image display layer, and the switching unit, respectively, wherein a first polarization plate among the plurality of polarization plates is disposed between the first TN switching cell and the second TN switching cell, and includes a (2-1)-th polarization plate disposed on an upper side of the first TN switching cell and a (2-2)-th polarization plate disposed on a lower side of the second TN switching cell.

19. The liquid crystal display device of claim 18, wherein a second polarization plate among the plurality of polarization plates is disposed between the backlight unit and the first TN switching cell.

20. The liquid crystal display device of claim 19, wherein a third polarization plate among the plurality of polarization plates is disposed between the second TN switching cell and a liquid crystal display panel as the image display layer.

* * * * *